US009718445B2

(12) United States Patent
Caillot et al.

(10) Patent No.: US 9,718,445 B2
(45) Date of Patent: Aug. 1, 2017

(54) ASSEMBLY FOR PRODUCING A MOTOR VEHICLE WINDSCREEN WIPING SYSTEM AND CONNECTION DEVICE INCLUDING SUCH AN ASSEMBLY

(71) Applicant: Valeo Systèmes d'Essuyage, Le Mesnil Saint Denis (FR)

(72) Inventors: Gérald Caillot, Cernay la Ville (FR); Denis Thebault, Clermont Ferrand (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 320 days.

(21) Appl. No.: 14/276,825

(22) Filed: May 13, 2014

(65) Prior Publication Data

US 2014/0331439 A1    Nov. 13, 2014

(30) Foreign Application Priority Data

May 13, 2013    (FR) ...................... 13 54269

(51) Int. Cl.
*B60S 1/46*    (2006.01)
*B60S 1/40*    (2006.01)
(Continued)

(52) U.S. Cl.
CPC ........... *B60S 1/4038* (2013.01); *B60S 1/3862* (2013.01); *B60S 1/4045* (2013.01); *B60S 1/4048* (2013.01);
(Continued)

(58) Field of Classification Search
CPC .... B60S 1/3439; B60S 1/3862; B60S 1/4038; B60S 1/4045; B60S 1/4048;
(Continued)

(56) References Cited

U.S. PATENT DOCUMENTS 5,611,103 A    3/1997    Lee
8,381,348 B2 *    2/2013    Egner-Walter .......... B60S 1/381
15/250.04
(Continued)

FOREIGN PATENT DOCUMENTS

CN        101087708 A    12/2007
WO        2009155230 A1    12/2009
WO    WO2012/072301 A1 *    6/2012

OTHER PUBLICATIONS

The First Office Action issued in corresponding Chinese Patent Application No. 201410333836.3, dated May 2, 2017 19 pages).

*Primary Examiner* — Gary Graham
(74) *Attorney, Agent, or Firm* — Osha Liang LLP

(57) ABSTRACT

The invention concerns an assembly (1) for producing a motor vehicle windscreen wiping system (3), including an end fitting (5) of a wiper arm (7) adapted to move a wiper (9), a hydraulic and/or electrical connector (11) for feeding a liquid to the wiper and/or for heating the liquid, said end fitting (5) being configured to accept an adapter (13) allowing rotation between said arm (7) and the wiper (9), said end fitting (5) internally accepting said connector (11), said end fitting (5) being configured to engage said hydraulic and/or electrical connector (11), in an oriented manner relative to the end fitting (5), in a so-called service position, allowing the disconnection and/or the connection of the connector (11) on the arm (7).

12 Claims, 3 Drawing Sheets

(51) Int. Cl.
*B60S 1/38* (2006.01)
*B60S 1/52* (2006.01)

(52) U.S. Cl.
CPC ........ *B60S 1/524* (2013.01); *B60S 2001/4054* (2013.01)

(58) Field of Classification Search
CPC ...... B60S 2001/4054; B60S 2001/4051; B60S 1/522; B60S 1/524
USPC ............................ 15/250.32, 250.04, 250.43
See application file for complete search history.

(56) References Cited

U.S. PATENT DOCUMENTS 8,549,696 B2 * 10/2013 Boland ................. B60S 1/3848
15/250.32
2012/0110773 A1 * 5/2012 Thielen ................. B60S 1/4003
15/250.32

* cited by examiner

ASSEMBLY FOR PRODUCING A MOTOR VEHICLE WINDSCREEN WIPING SYSTEM AND CONNECTION DEVICE INCLUDING SUCH AN ASSEMBLY

The field of the present invention is that of equipment for vehicles and more particularly that of equipment for wiping the windows of motor vehicles.

Motor vehicles are routinely equipped with windscreen wiping systems for washing the windscreen and preventing disturbance to the driver's view of their environment. In the working position, these windscreen wipers are conventionally driven by wiper arms effecting an angular to-and-fro movement and include elongate wipers carrying wiper blades made from an elastic material. These blades rub against the windscreen and evacuate water out of the field of view of the driver. The wipers are produced in either the conventional form of articulated supporting bars that hold the wiper blade at a plurality of discrete locations or a more recent, so-called "flat blade" form of a semi-rigid assembly that holds the wiper blade over the whole of its length. In both solutions, the wiper is attached to the wiper arm by an assembly consisting of a mechanical connector and an adapter. The mechanical connector is a part that is crimped to the supporting bar or directly to the flat wiper and the adapter is an intermediate part for fixing the connector to the wiper arm. These two parts are connected to each other by a transverse shaft that allows relative rotation thereof in a plane perpendicular to the windscreen and passing through the wiper arm.

It is also known to provide vehicles with devices for feeding a windscreen washing liquid from a tank located under the bonnet and spraying it in the direction of the windscreen via nozzles located either near the windscreen or on the windscreen wiper itself for better distribution of the liquid. In the case of nozzles on the wipers, the windscreen washing liquid is fed via pipes that are fixed to the wiper arm and are connected to the wiper via a connection interface at the level of the mechanical connector. The connection interface is fixed to the mechanical connector by appropriate terminations and makes the necessary seal to it.

While the liquid pipes and the connection interface are generally connected to the wiper arm, the connection interface is connected to the wiper and it is necessary to connect the connection interface to the mechanical connector when changing the wiper. This operation is effected in a so-called service position.

It is necessary to ensure that the connection interface is correctly aligned during installation in the mechanical connector, failing which incorrect assembly would be reflected in a risk of the windscreen washing liquid leaking and/or an electric insulation defect at the level of the junction of the two connectors.

Furthermore, it is important that the connection interface remains attached to the wiper arm during decoupling or demounting of the wiper relative to the wiper arm. This prevents the connection interface being entrained by the mechanical connector during the movement separating it from the wiper arm.

However, after mounting the wiper in the arm, the connection interface must not limit the necessary freedom of movement in rotation of the adapter relative to the mechanical connector, in particular when the wiping system is again in its working position.

To this end there are known windscreen wipers in which the connection interface is held in the service position by clipping it into openings in a part attached to the wiper arm. However, this necessitates an intermediate part that is relatively complex to manufacture and to assemble to the arm.

An object of the present invention is to remedy some or all of these drawbacks.

To this end, the invention consists in an assembly for producing a motor vehicle windscreen wiping system including an end fitting of a wiper arm adapted to move a wiper, said assembly further including a connection interface, notably a hydraulic and/or electrical connector for feeding a liquid to the wiper and/or for heating the liquid, said end fitting being configured to accept an adapter allowing rotation between said arm and the wiper, said end fitting internally accepting said connection interface.

According to the invention, said end fitting is configured to engage said connection interface in an oriented manner, relative to the end fitting, via at least one folded tab which is in the same material from the end fitting, in a so-called service position, allowing the disconnection and/or the connection of the wiper on the arm.

Thus, the connection interface is immobilized in an oriented manner in the service position with no intermediate part, by being indexed in position on the arm, both for the disconnection and for the connection of said wiper on the arm. Outside of said service position, said assembly is configured for said connection interface to be free relative to the end fitting. Said end fitting is configured for the engagement to be obtained by a movement of the wiper relative to the arm, for example a rotation of the wiper relative to the arm.

The engagement is thus obtained in a determined position, advantageously a position corresponding to an apeak angle that is zero or close to zero, even negative, of the wiper relative to the arm, which makes it possible not to limit the rotation of the wiper relative to the arm because said engagement does not interfere with the working position.

Said position of engagement is advantageously felt by the user notably by the presence of a hard locking point determining the service position.

According to the invention, the following characteristics will be able to be used, taken separately or in combination:

said end fitting comprises a body configured to securely attach said connection interface to said body, upon said engagement, by assembly with shapes derived from the material of said body, the end fitting and said connection interface are provided with complementary shapes allowing them to be securely assembled together, upon said engagement, for example by clipping, said end fitting has at least one folded tab toward the inside of the end fitting and the at least one folded tab is in the same material from the end fitting, said body is configured to accept said adapter, notably by a translational movement on an axis of longitudinal extension of the end fitting, said body is configured to allow said adapter to be fixed to said end fitting, reversibly, for example by means of a retractable locking button, the end fitting comprises at least one tab provided with an orifice to allow a pin of the connection interface to be engaged upon the engagement of said connection interface with the end fitting, said tab is provided with a pin to allow for the engagement of a void or an orifice of the connection interface upon the engagement of said connection interface with the end fitting, said tab is arranged inside the end fitting, thus being invisible, said tab is formed in a top part of the end fitting, that is to say a part of the end fitting intended to be opposite the wiper, and this is preferred to a median part, said tab is obtained by cutting a wall of said body forming an orifice receiving the retractable locking button, said pin comprises a notching or a deformation corresponding to said engagement, said tab is formed on a side part of the end fitting, said tab is obtained by cutting and folding a wall of the body of the end fitting, said assembly comprises two tabs, each formed on a side part of the end fitting and possibly symmetrical to one another relative to a median longitudinal plane of the end fitting, said connection interface comprises at least one snug shaped to cooperate with said tab or tabs upon said engagement of the connection interface with the end fitting, said connection interface comprises, for example, a hydraulic and/or electrical connector.

The invention also relates to a connection device of a vehicle windscreen wiping system including said assembly as described above, a mechanical connector adapted to be fixed to said wiper to attach it to the wiper arm and said adapter adapted to be articulated on said mechanical connector to allow rotation between the wiper and the arm, said adapter being configured to be inserted in said end fitting.

Said end fitting, said adapter and/or said mechanical connector are mutually configured to guide the mechanical connector and/or the adapter, notably in translation, in said end fitting on insertion of one in the other. Said mechanical connector is further configured to allow hydraulic and/or electrical connection of the wiper to said connection interface.

The invention makes it possible, in the service position, when changing a wiper, to align said connection interface and said mechanical connector. In the working position, provision will be able to be made for the mechanical connector to support the hydraulic connector and/or the electrical connector.

The locking of the connection of the mechanical connector to the wiper arm is ensured by the adapter, via the locking button thereof cooperating in an opening provided for this purpose in the end fitting.

The invention also concerns a vehicle windscreen wiping system including a wiper, a wiper arm and a connection device as described above for connecting the wiper to the wiper arm and connecting them hydraulically and/or electrically.

The invention will be better understood and other objects, details, features and advantages thereof will become more clearly apparent in the course of the following detailed explanatory description of a number of embodiments of the invention provided by way of purely illustrative and non-limiting example given with reference to the appended diagrammatic drawings.

It must be noted that the figures disclose the invention in detail and that they may of course serve to define the invention better, if necessary.

In the remainder of the description, the terms longitudinal and lateral refer to the orientation of the wiper arm on which the windscreen wiper is mounted. The longitudinal direction corresponds to the main axis of the wiper arm along which it extends while the lateral orientations correspond to concurrent straight line segments, i.e. segments that cross the longitudinal direction, notably perpendicularly to the longitudinal axis of the wiper arm. For the longitudinal directions, the term front designates the direction going from a proximal end to a distal end of the wiper arm and the term rear to the opposite direction. Furthermore, the directions referred to as upper and lower correspond to orientations perpendicular to the rotation plane of the wiper arm, the term lower including the plane of the windscreen.

Finally, identical reference numbers are used to designate identical or similar elements.

Figure 1:
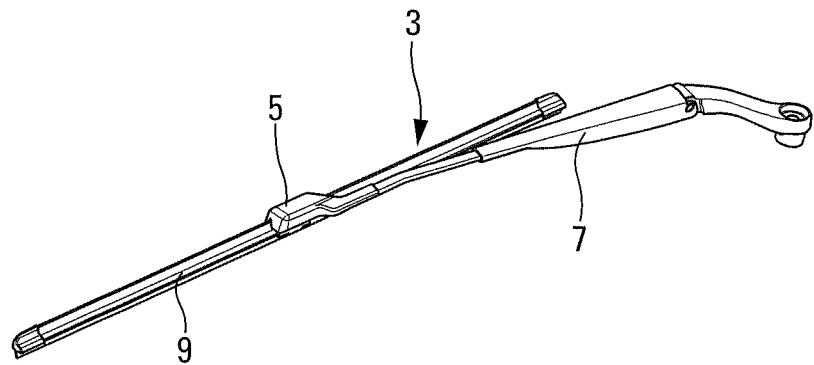
FIG. 1 is a general perspective view of a motor vehicle wiping system including a connection device in accordance with one embodiment of the invention.
Figure 2:
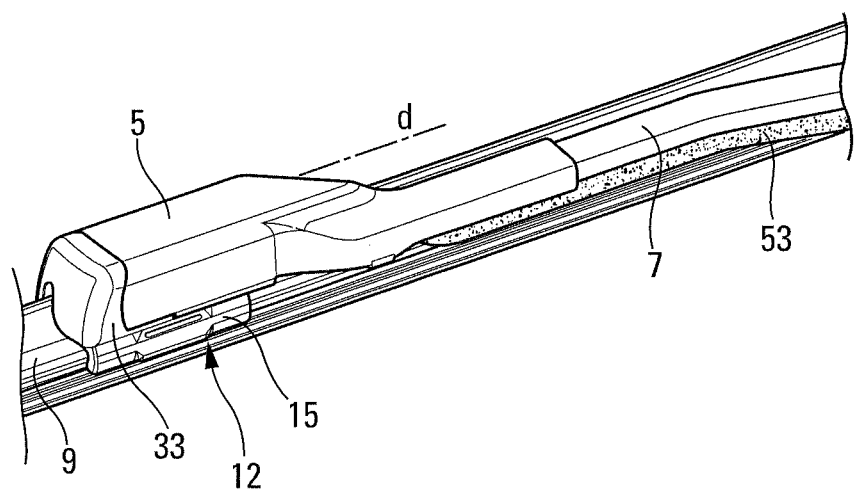
FIG. 2 is a view of a detail from FIG. 1.

As shown in FIGS. 1 and 2, the invention concerns a wiping system 3 including a wiper 9 and a wiper arm 7. The wipers 9 are flat wipers as mentioned above, known per se. Said system further includes a device 12 for connecting the wiper 9 to the arm 7.

Figure 8:
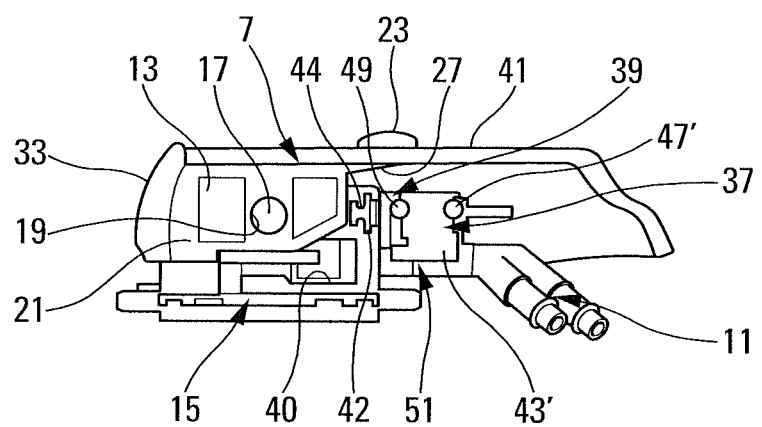
FIG. 8 is a schematic view, in longitudinal cross section, of the connection device according to the second embodiment, in the service position.

Reference will be able to be made to FIG. 8 for a more detailed description of the elements of an embodiment of said connection device 12. It comprises an adapter 13 and a mechanical connector 15, the adapter 13 and the mechanical connector 15 represented in this figure being suitable not only for the second embodiment of the invention in question in these figures but also for the first embodiment and, more generally, for other embodiments that are not illustrated.

Said adapter 13 allows rotation between the wiper 9 and the wiper arm 7. In fact, the wiper must have at least one degree of freedom in rotation relative to the wiper arm and more specifically relative to an end fitting 5 of said arm 7, to allow the wiper to follow the curvature of the window to be wiped. Said adapter 13 is articulated on the mechanical connector 15, which to this end here includes pins 17 on its lateral flanks, said pins cooperating with orifices 19 in lateral flanks of said adapter. The mechanical connector 15 is inserted in a yoke 21 of the adapter, for example.

The adapter 13 is configured to be inserted in the end fitting 5 by movement in translation along a longitudinal axis d along which the end fitting 5 extends so as to come into a position of use in which it is abutted against the end fitting 5 into which it is reversibly fixed by means of a retractable locking button 23 that cooperates with a recess 25 provided for this purpose in the end fitting 5. In this position, said end fitting 5 covers the adapter 13. The retractable button 23 and/or the recess 25 are here in upper portions of said adapter 13 and said end fitting 5, respectively, said button 23 being located at the rear end of a flexible lug 27 of the adapter. Numerous locking variants are possible.

Figure 7:
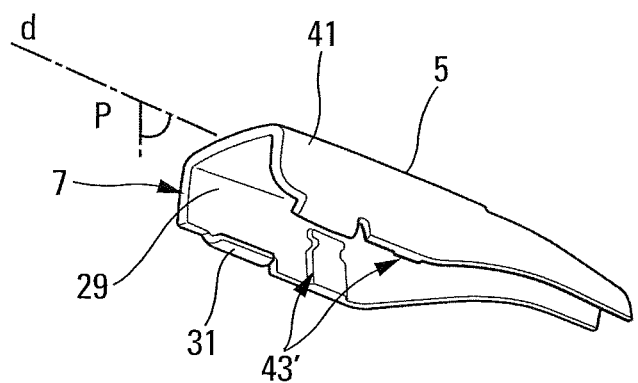
FIG. 7 is a perspective view of the end fitting of the connection device according to a second embodiment of the invention.

Here the end fitting 5 has an inverted "U" shape with the opening of this "U" shape facing the windscreen. The yoke shape 21 of the adapter 13 is complementary to the internal volume of the end fitting 5, for example, so as to be accommodated in the latter. When the wiper 9 is placed in the wiper arm 7, the adapter is inserted in said end fitting via an opening 29 at the distal end of the latter and guided in translation in the latter by rims 31 of its lateral flanks (FIG. 7).

The mechanical connector 15 fastened to the wiper 9 or preferably the adapter 13 may have an external wall 33, referred to as the cap, closing the front portion of the end fitting 5.

This being so, according to the invention, the invention also concerns an assembly 1 for producing the wiping system 3. Said assembly includes the end fitting 5 of the arm 7 and a connection interface 11 accommodated in this end fitting 5. Here said connection interface 11 includes a hydraulic connector 37 and/or an electrical connector 39, possibly fastened to each other, also referred to hereinafter as a hydraulic and/or electrical connector. Said connection interface 11 is used to feed a liquid to the wiper 9 and/or to heat the liquid and/or the wiper.

The face opposite the cap 33, referred to as the inner face, faces toward said hydraulic and/or electrical connector 11.

Here the mechanical connector 15 includes orifices 40 for connecting it to corresponding spigots 51 of the hydraulic connector 37 leading to internal passages 53 for distributing the windscreen washing liquid to the wiper and orifices 42 for connecting terminals 44 of the electrical connector 39. There will in particular be able to be one or two connection orifices 40, respectively corresponding to one or two spigots 51 of the hydraulic connector and/or to one or two internal channels 53 of the wiper.

Said end fitting 5 is configured to engage said hydraulic and/or electrical connector 11, in an oriented manner relative to the end fitting 5, in a position allowing the disconnection and/or the connection of the connector 11 on the arm 7, that is to say in the service position.

More specifically, said end fitting 5 comprises a body 41 configured to securely attach said hydraulic and/or electrical connector 11 to itself, upon said engagement, by the assembly of different parts of said body 41 with the connector 11 and/or by assembly with shapes derived from the material of said body 41 with the hydraulic and/or electrical connector 11.

The end fitting 5 and said hydraulic and/or electrical connector 11 may even be provided with complementary shapes allowing them to be securely assembled together, upon said engagement, for example by clipping, pinching or similar. Common to the different embodiments way, the end fitting 5 of the arm 7 has at least one folded tab 43, 43' folded from the end fitting 5 arranged to hold the hydraulic and/or electrical connector .ie connection interface 11.

According to the first embodiment represented in FIGS. 3 to 6, the end fitting 5 comprises a folded tab 43 provided with an orifice 45 to allow for the engagement of a pin 47 of the hydraulic and/or electrical connector and thus said engagement of the hydraulic and/or electrical connector with the end fitting 5. More specifically, the pin 47 is formed on the hydraulic connector 37 and/or is mounted on the electrical connector 39 to securely attach the latter to the hydraulic connector.

Said tab 43 is arranged inside the end fitting 5, thus being invisible. It is formed in the top part of the end fitting, in particular in the median part thereof. It will be able to be obtained by cutting and folding a wall of the body 41 of the end fitting forming said void 25.

The end fitting 5 according to the second embodiment represented in FIGS. 7 and 8 here comprises at least one tab 43' shaped to engage, for example by clipping, at least one snug 47' of said hydraulic and/or electrical connector upon said engagement of the hydraulic and/or electrical connector with the end fitting.

Said tab 43' is formed, notably, on a side part of the end fitting 5, by being, for example, folded towards the interior thereof and therefore invisible.

Said tab is here also obtained by cutting and folding a wall of the body 41, in particular a side edge of the end fitting 5.

Said assembly 1 represented advantageously comprises two tabs 43' each formed on a side part of the end fitting 5 and symmetrical to one another relative to a median longitudinal plane P of the end fitting. The tabs 43' cooperate together upon the engagement with the snugs 47' of the hydraulic and/or electrical connector, preferably each receiving two snugs 47' in two opposing voids 49 in its top part. Said tabs 43' will be able to have inclined slopes favouring said clipping.

Said tabs 43, 43' are situated at a distance from the axis of rotation of the adapter relative to the mechanical connector.

Said engagement is advantageously obtained in a position of the hydraulic and/or electrical connector parallel to the direction of the axis of longitudinal extension d of the end fitting, that is to say when the end fitting 5 and the spigots 51 or plugs 44 of the hydraulic and/or electrical connector are arranged in said direction of longitudinal extension d of the end fitting.

Said end fitting 5 is further configured to allow the separation of said engagement of the end fitting 5 and of said hydraulic and/or electrical connector. In other words, the position of engagement of the hydraulic and/or electrical connector can be left by rotation of the wiper 9 relative to the arm 7, by exerting a pressure on the wiper for this purpose, to restore the working position of the wiping system 3. Thus, said engagement is obtained by a movement of the wiper 9 relative to said arm 7, with slight forcing, and/or similarly the separation to switch the wiping system to the working position.

It will be noted that, in the preceding embodiments, in the working position, there is no supporting part for the hydraulic and/or electrical connector in the end fitting. On the contrary, the hydraulic and/or electrical connector is borne by said mechanical connector 15, in particular by virtue of hooking of the hydraulic and/or electrical connector.

The operation of the connection devices is now described.

Figure 3:
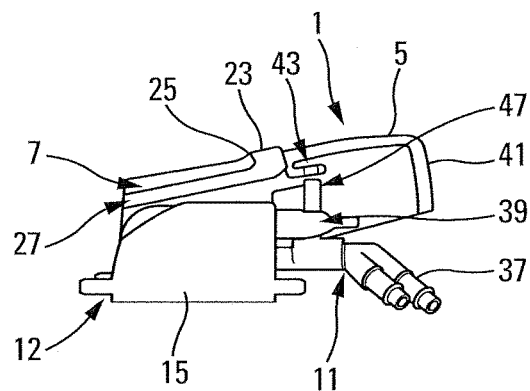
FIG. 3 is a schematic view in longitudinal cross section of a connection device of a vehicle windscreen wiping system in accordance with a first embodiment of the invention in a working position.
Figure 5:
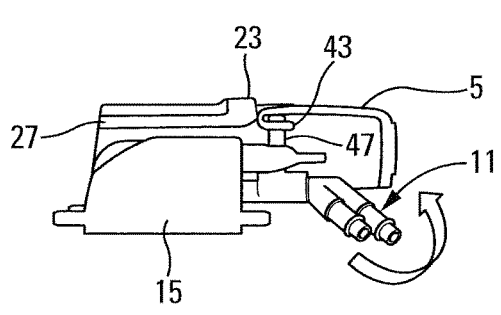
FIG. 5 is a schematic view, in longitudinal cross section, of the device of FIG. 4.
Figure 4:
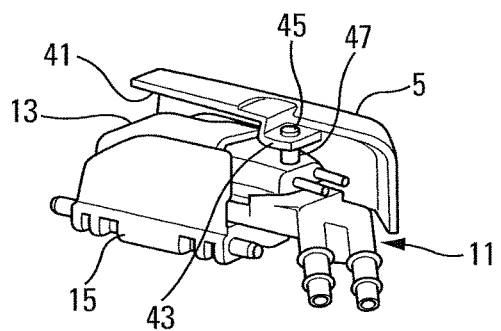
FIG. 4 is a perspective view in longitudinal cross section of this connection device in a service position.
Figure 6:
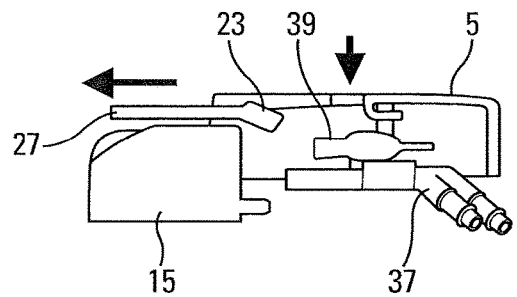
FIG. 6 is a view analogous to FIG. 5, showing the disconnection of the mechanical connector of the connection device.

To change a wiper, it is sufficient to engage the hydraulic and/or electrical connector 11 relative to the end fitting 5, for example by rotating the wiper 9 relative to the arm 7, as represented in FIG. 3. This is done in a service position, outside of the engagement, until in the position of engagement of the connector and of the end fitting, namely said position of zero or negative apeak angle of the wiper relative to the arm. A pressure must be exerted on the wiper in the direction of rotation according to the arrow of FIG. 5 for the engagement. The pin 47 of the connector is then engaged in the orifice 45 of the tab 43 for the first embodiment (FIG. 4) and the snugs 47' of the connector are engaged in the voids 49 of the tab 43' for the second embodiment (FIG. 8). At this moment, with the engagement being secured, the locking button 23 of the adapter can be pressed in as represented in FIG. 6, and the adapter 13 and therefore the mechanical connector and the wiper 9 which is fixed thereto, can be extracted translationally from the end fitting 5.

The connection with a view to replacement of the wiper 9 with another is performed by a movement that is the reverse of the preceding movement, the locking of the button 23 being performed in the position of engagement, at the end of the insertion of the adapter 13 into the end fitting and therefore of the wiper into the arm. At this moment, the wiper 9 can be rotated relative to the arm 7 to disengage the hydraulic and/or electrical connector and the end fitting and allow the wiping system to be enabled.

The invention therefore provides the possibility of easy replacement of a wiper by another one in equipment for wiping the windows of motor vehicles including wipers, in particular produced in the so-called "flat blade" form.

The invention claimed is:

1. An assembly for producing a motor vehicle windscreen wiping system, comprising:
    an end fitting of a wiper arm adapted to move a wiper; and
    a connection interface, said end fitting being configured to accept an adapter allowing rotation between said arm and the wiper, said end fitting internally accommodating said connection interface and being configured to engage said connection interface in an oriented manner, relative to the end fitting, via at least one folded tab from the end fitting in a service position,
    wherein, in the service position, the vehicle windscreen wiping system is in an at least partially disassembled state, to enable separation of the wiper from the wiper arm,
    wherein, in a working position, the vehicle windscreen wiping system is in a fully assembled state, configured for windshield wiping,
    wherein the at least one folded tab is provided with an orifice configured to:
        engage a pin of the connection interface when the windscreen wiping system is in the service position; and
        not engage the pin when the windscreen wiping system is in the working position.

2. The assembly according to claim 1, wherein said connection interface is rotationally mobile relative to the end fitting from the working position of the wiping system, out of said engagement, to said service position.

3. The assembly according to claim 1, wherein, in the service position, the connection interface is rigidly locked to the end fitting.

4. The assembly according to claim 1, wherein said end fitting comprises a body configured to securely attach said connection interface to said body, at the time of said engagement, by assembly with shapes derived from the material of said body.

5. The assembly according to claim 1, wherein a body is configured to accept said adapter by a translational movement.

6. The assembly according to claim 1, wherein said tab is arranged inside the end fitting, being formed in a top part of the end fitting.

7. The assembly according to claim 1, shaped so that said position of engagement corresponds to an apeak angle of zero or dose to zero, even a negative angle, of the wiper relative to the arm.

8. A connection device of a vehicle windscreen wiping system comprising:
    an assembly according to claim 1; and
    a mechanical connector adapted to be fixed to said wiper to attach the wiper to the wiper arm,
    said adapter adapted to be articulated on said mechanical connector to allow rotation between the wiper and the arm, said adapter being configured to be inserted in said end fitting.

9. The connection device according to claim 8, wherein said mechanical connector is configured to allow a hydraulic and/or electrical connection of the wiper to said connection interface.

10. The connection device according to claim 8, wherein said adapter comprises a locking button cooperating in an opening of the end fitting.

11. The connection device according to claim 8, wherein said mechanical connector is adapted to support said connection interface.

12. A vehicle windscreen wiping system comprising:
    a wiper;
    a wiper arm and a connection device according to claim 8 for attaching said wiper to said wiper arm.

* * * * *